United States Patent
Bösmann et al.

(10) Patent No.: US 11,383,974 B2
(45) Date of Patent: Jul. 12, 2022

(54) METHOD AND APPARATUS FOR DEHYDROGENATING A HYDROGEN CARRIER MEDIUM

(71) Applicant: HYDROGENIOUS LOHC TECHNOLOGIES GMBH, Erlangen (DE)

(72) Inventors: Andreas Bösmann, Hessdorf (DE); Patrick Preuster, Heideck (DE); Peter Wasserscheid, Erlangen (DE); Denise Geburtig, Nuremberg (DE)

(73) Assignee: HYDROGENIOUS LOHC TECHNOLOGIES GMBH, Erlangen (DE)

( * ) Notice: Subject to any disclaimer, the term of this patent is extended or adjusted under 35 U.S.C. 154(b) by 84 days.

(21) Appl. No.: 17/254,772

(22) PCT Filed: Jun. 6, 2019

(86) PCT No.: PCT/EP2019/064819
§ 371 (c)(1),
(2) Date: Dec. 21, 2020

(87) PCT Pub. No.: WO2019/243073
PCT Pub. Date: Dec. 26, 2019

(65) Prior Publication Data
US 2021/0276862 A1 Sep. 9, 2021

(30) Foreign Application Priority Data

Jun. 22, 2018 (DE) .................... 10 2018 210 247.3
Jun. 25, 2018 (DE) .................... 10 2018 210 337.2

(51) Int. Cl.
*C01B 3/00* (2006.01)
*B01J 21/18* (2006.01)
*B01J 23/44* (2006.01)

(52) U.S. Cl.
CPC ............ *C01B 3/0015* (2013.01); *B01J 21/18* (2013.01); *B01J 23/44* (2013.01)

(58) Field of Classification Search
CPC ........................ B01J 21/18; B01J 2219/00779; B01J 19/006; B01J 23/44; B01J 19/0066; C01B 2203/1064; C01B 3/0015; Y02E 60/32
See application file for complete search history.

(56) References Cited

U.S. PATENT DOCUMENTS

| | | |
|---|---|---|
| 2010/0055513 A1 | 3/2010 | Soloveichik |
| 2014/0014205 A1 | 1/2014 | Barton |
| 2014/0134100 A1 | 5/2014 | Naeemi et al. |
| 2016/0141694 A1 | 5/2016 | Soloveichik et al. |
| 2017/0008762 A1 | 1/2017 | Arlt et al. |
| 2017/0166496 A1 | 6/2017 | Imagawa et al. |
| 2018/0093889 A1 | 4/2018 | Toon et al. |

FOREIGN PATENT DOCUMENTS

| | | | |
|---|---|---|---|
| CN | 1 980 857 A * | 6/2007 | ............. C01B 3/065 |
| DE | 10055717 A1 | 5/2002 | |
| DE | 102014201332 A1 | 7/2015 | |
| EP | 1475349 A2 | 11/2004 | |
| JP | 2004 082 007 A * | 3/2004 | ............. B01J 21/18 |
| JP | 2015030653 A | 2/2015 | |
| WO | WO 2015 110 334 A1 * | 7/2015 | ............. C07C 15/04 |

OTHER PUBLICATIONS

Ferreira-Aparicio P et al. "On the Performance of Porous Vycor Membranes for Conversion Enhancement in the Dehydrogenation of Methylcyclohexane to Toluene" Journal of Catalysis, Academic Press, Duluth, MN, US, vol. 212, No. 2, Dec. 10, 2002 (Dec. 10, 2002), pp. 182-192, [retrieved on Dec. 10, 2002] ISSN: 0021-9517, XP027233544.

Gang Li et al. "Highly enhanced ammonia decomposition in a bimodal catalytic membrane reactor for CO-free hydrogen production" Catalysis Communications, Elsevier, Amsterdam, NL, vol. 15, No. 1, Aug. 10, 2011 (Aug. 10, 2011), pp. 60-63, [retrieved on Aug. 18, 2011] DOI: 10.1016/J.CATCOM.2011.08.011 ISSN: 1566-7367, XP028322240.

Geburtig Denise et al. "Chemical utilization of hydrogen from fluctuating energy sources—Catalytic transfer hydrogenation from charged Liquid Organic Hydrogen Carrier systems" International Journal of Hydrogen Energy, Elsevier Science Publishers B. V., Barking, GB, vol. 41, No. 2, Nov. 7, 2015 (Nov. 7, 2015), pp. 1010-1017 DOI: 10.1016/J.IJHYDENE.2015.10.013.

* cited by examiner

*Primary Examiner* — Timothy C Vanoy
(74) *Attorney, Agent, or Firm* — McGlew and Tuttle, P.C.

(57) ABSTRACT

A method for dehydrogenating a hydrogen carrier medium comprises the method steps of providing a metal-containing catalyst material, an at least partially loaded hydrogen carrier medium, a metal-free reaction accelerator substance, transferring hydrogen from the hydrogen carrier medium to the reaction accelerator substance and releasing hydrogen gas from the reaction accelerator substance.

18 Claims, 5 Drawing Sheets

METHOD AND APPARATUS FOR DEHYDROGENATING A HYDROGEN CARRIER MEDIUM

CROSS-REFERENCE TO RELATED APPLICATIONS

This application claims the priority of German Patent Application, Serial No. DE 10 2018 210 337.2, filed on Jun. 25, 2018, and of German Patent Application, Serial No. DE 10 2018 210 247.3, filed on Jun. 22, 2018, pursuant to 35 U.S.C. 119(a)-(d), the content of which is incorporated herein by reference in its entirety as if fully set forth herein.

FIELD OF THE INVENTION

The invention relates to a method and an apparatus for dehydrogenating a hydrogen carrier medium.

BACKGROUND OF THE INVENTION

A carrier medium for chemically binding hydrogen is known from EP 1 475 349 A2.

The hydrogen carrier medium is a liquid organic hydride which is referred to as a Liquid Organic Hydrogen Carrier (LOHC). An LOHC can be loaded with hydrogen, that is to say hydrogenated. In the hydrogenated form, the hydrogen is chemically bound to the hydrogen carrier medium. The carrier medium is in a loaded state. In particular, the LOHC can be reversibly loaded with hydrogen and unloaded of hydrogen again. The physicochemical properties of the LOHC are highly similar to conventional liquid fuels, meaning that pumps and tankers for transport and containers for storage of LOHCs from the fuel logistics sector can be used. The storage of hydrogen in chemically bound form in an organic liquid enables unpressurized storage under standard conditions and over long periods of time, without a significant loss of hydrogen. Known LOHCs include aromatic compounds having at least one π-electron system which are converted into the respective saturated, alicyclic compounds in a catalytic hydrogenation. Examples of LOHCs are dibenzyltoluene and benzyltoluene as pure substances, isomeric mixtures, or mixtures of these substances with one another. LOHCs may also be polycyclic, heteroaromatic compounds having at least one π-electron system which are converted by hydrogenation into the respective saturated, polycyclic compounds containing heteroatoms such as nitrogen or oxygen. LOHCs in particular are N-ethylcarbazole, N-propylcarbazole, N-isopropylcarbazole, N-butylcarbazole or mixtures of these substances. Possible LOHCs are also oligomers or polymers with extensive π-conjugated electron systems, which are converted by hydrogenation into the respective saturated compounds. For release of the hydrogen, the hydrogen carrier medium, that is to say the LOHC, is dehydrogenated by supplying heat in the presence of a catalyst, the LOHC being converted into the unloaded form. During unloading of the LOHC, hydrogen is released from an organic molecule or from a mixture of organic molecules via a catalyzed dehydrogenation reaction. This means that the release of the hydrogen is effected via a physical transformation of the at least partially loaded hydrogen carrier medium in a reaction vessel by means of a catalyzed dehydrogenation reaction.

It has been found that the release rate, that is to say the amount of hydrogen released per unit of time, is limited with the methods known from the prior art. The dehydrogenation of the hydrogen carrier medium in accordance with the prior art is accordingly uneconomical at temperatures of below 250° C. An industrially utilizable release rate of at least 10 standard liters of hydrogen per liter of catalyst volume and per minute can only be achieved in the methods according to the prior art when the reaction temperature is more than 250° C.

SUMMARY OF THE INVENTION

An object of the invention is that of improving the release of hydrogen from a hydrogen carrier medium from an economical standpoint, so that hydrogen is released in particular with an increased release rate and in particular at reduced temperatures.

The object is achieved by a method for dehydrogenating a hydrogen carrier medium, comprising the method steps of providing a metal-containing catalyst material, an at least partially loaded hydrogen carrier medium, a metal-free reaction accelerator substance, transferring hydrogen from the hydrogen carrier medium to the reaction accelerator substance and releasing hydrogen gas from the reaction accelerator substance. The object is further achieved by an apparatus for dehydrogenating a hydrogen carrier medium according to the invention, having at least one reaction vessel and a contacting unit arranged in the at least one reaction vessel.

The essence of the invention consists in that for the dehydrogenation of an at least partially loaded hydrogen carrier medium a metal-free reaction accelerator substance is used in addition to a metal-containing catalyst material. The hydrogen carrier medium is in particular an LOHC and in particular is heteroatom-free. The LOHC consists in particular exclusively of carbon atoms and hydrogen atoms. It has been found that heteroatom-free LOHC substances are advantageous compared to substances containing heteroatoms such as nitrogen or boron. Heteroatom-free LOHC substances are chemically very similar to the fuels used nowadays, and so the infrastructure for fuel transport, fuel storage and fuel distribution can be used for the transport, storage and the distribution of the LOHC substance. In particular, the heteroatom-free LOHC substances are more readily available and are obtainable more cost-effectively, since these substances can be obtained directly from petrochemical base chemicals. The heteroatom-free carrier media do not have the disadvantage that the melting point in the hydrogen-unloaded state is above room temperature, which would complicate the use of the LOHC systems for industrial applications.

The heteroatom-free LOHC substance dibenzyltoluene for example possesses a melting point of below −35° C. The heteroatom-containing LOHC substance N-ethylcarbazole has a melting point of 70° C.

The thermal stability of the heteroatom-free hydrogen carrier media is increased compared to the heteroatom-containing carrier media due to the comparatively more stable carbon-carbon bonds. Undesired thermal decomposition reactions are reduced in the heteroatom-free hydrogen carrier medium.

Suitable metal-containing catalysts are in particular catalysts containing the elements platinum, palladium and/or nickel. Catalysts are also possible which include different or additional elements such as rhodium, iridium, gallium, chromium, iron, cobalt and/or copper. It is essential that the metal-containing catalysts used have the ability to activate LOHC-bound hydrogen, to transfer it to the metal-free reaction accelerator substance and to release it from there as elemental hydrogen. The metal-containing catalyst is suitable both for transfer hydrogenating and for dehydrogenating.

For dehydrogenating, the at least partially loaded hydrogen carrier medium is contacted in particular directly with the metal-containing catalyst and the metal-free reaction accelerator substance. Contacting can take place in a single reaction vessel in which the three components, that is to say the hydrogen carrier medium, the catalyst and the reaction accelerator substance, are present. The contacting can also be effected stepwise in a plurality of, in particular successively connected, reaction vessels. Hydrogen is transferred in particular directly from the hydrogen carrier medium to the reaction accelerator substance. As an alternative, the hydrogen can also be transferred in atomic form from the hydrogen carrier medium to the reaction accelerator substance. The metal-free reaction accelerator substance has the ability to take up hydrogen in the presence of a metal-containing catalyst. The metal-free reaction accelerator substance also has the ability to rapidly emit the taken-up hydrogen at comparatively low temperatures in order thus to release hydrogen gas.

The metal-free reaction accelerator substance is in particular initially in a hydrogen-depleted form. Via reaction with the loaded hydrogen carrier medium in the presence of the metal-containing catalyst, the metal-free reaction accelerator substance is converted into a hydrogen-enriched form. The hydrogen-enriched form of the metal-free reaction accelerator substance differs in particular from the at least partially loaded hydrogen carrier medium. The hydrogen-depleted form of the metal-free reaction accelerator substance differs in particular from the at least partially unloaded hydrogen carrier medium. In particular, the metal-free reaction accelerator substance and the hydrogen carrier medium are two different and in particular two separate substance systems. In the method according to the invention, hydrogen is transferred from the at least partially loaded hydrogen carrier medium, that is to say from a first substance system, to the hydrogen-depleted form of the metal-free reaction accelerator substance, that is to say to a second substance system which differs from the first substance system. Subsequently, hydrogen gas, which in particular has previously been transferred to the metal-free reaction accelerator substance in the hydrogen-depleted form, is released from the hydrogen-enriched form of the reaction accelerator substance. The reaction accelerator substance differs from the hydrogen carrier medium.

It is essential that the hydrogen-enriched form of the reaction accelerator substance can emit hydrogen as elemental hydrogen gas at low temperatures and/or higher pressures than the hydrogen carrier medium given the same type and amount of metal-containing catalyst. As a result of the intermediate step of the invention, where hydrogen prior to release is firstly transferred from the hydrogen carrier medium to the reaction accelerator substance, the overall energy expenditure in the method for releasing hydrogen has been reduced since the release of hydrogen gas can take place at a lower temperature.

According to the invention, it has been recognized that the additional use of the metal-free reaction accelerator substance enables the release of hydrogen at reduced reaction temperatures with increased release rate, that is to say increased reaction speed.

It has been recognized that the reaction speed when dehydrogenating a hydrogen carrier medium is of essential importance for the economic viability of the method, since a target quantity of hydrogen to be released would require a larger reaction vessel in the event of a low release rate. This would give rise to additional installation space requirements and additional costs. This can be prevented according to the invention.

If the reaction accelerator substance is in the hydrogen-enriched form in the reaction vessel, the hydrogen is first released in gaseous form as elemental hydrogen from the hydrogen-enriched reaction accelerator substance in intensive contact with the at least partially loaded hydrogen carrier medium and with the metal-containing catalyst. This converts the reaction accelerator substance into the hydrogen-depleted form. Hydrogen is subsequently transferred from the hydrogen carrier medium in contact with the metal-containing catalyst to the hydrogen-depleted form of the reaction accelerator substance, forming the hydrogen-enriched form of the reaction accelerator substance. Elemental hydrogen is once again released in gaseous form from the hydrogen-enriched form of the reaction accelerator substance. This process repeats itself ideally until all of the releasable hydrogen in the loaded hydrogen carrier medium is present in gaseous form as elemental hydrogen.

The described processes in particular all take place simultaneously in the reaction vessel. They result—compared to the release of hydrogen without reaction accelerator substance—in the hydrogen being transformed from the hydrogen carrier medium to elemental hydrogen gas at much lower temperatures and/or much quicker, that is to say with an increased release rate.

A method comprising a reaction pressure of from 0.001 bar to 50 bar, in particular of from 0.3 bar to 20 bar, in particular of from 0.8 bar to 3 bar and in particular of less than 0.1 bar. 3. and a method comprising a reaction temperature of from 25° C. to 400° C., in particular of from 60° C. to 250° C., in particular of from 80° C. to 220° C. and in particular of less than 100° C., enable advantageous reaction conditions. In particular, the reaction temperature in the reaction vessel is reduced compared to the methods known from the prior art. In addition or as an alternative, the hydrogen can be obtained at a given temperature with a higher release rate.

A method comprising a release rate of at least 10 standard liters of hydrogen per liter of catalyst volume and per minute at a reaction temperature of less than 250° C., ensures an industrially utilizable unloading speed at reduced reaction temperatures. In particular, the industrially utilizable release rate of more than 10 standard liters of hydrogen per liter of catalyst volume and per minute is possible at temperatures of less than 250° C., in particular of less than 220° C., in particular of less than 200° C., in particular of less than 180° C. and in particular of less than 150° C.

The use of a reaction accelerator substance having at least one functional group which contains oxygen and/or nitrogen has proven to be particularly suitable.

A reaction accelerator substance which in the hydrogen-enriched form comprises secondary alcohols of the general form has proven to be advantageous. In particular, $R_1$ and $R_2$ are each independently linear or branched alkyl, aryl or aralkyl groups having one, more or, in polymer structures, a very large number of carbon atoms, which for their part may comprise further alcohol functions but also other functional groups such as nitrogen-containing groups, phosphorus-containing groups or halogen atoms. In addition, $R_1$ and $R_2$ may in particular be joined together in the form of a ring such that the hydrogen-enriched form of the metal-free reaction accelerator substance is a cycloalkanol compound. The cyclic compound may comprise further alcohol functions, but also other functional groups such as nitrogen-containing groups, phosphorus-containing groups or halogen atoms.

Ketone compounds are a corresponding hydrogen-depleted form of this reaction accelerator substance.

A reaction accelerator substance which in the hydrogen-enriched form comprises oligovinyl alcohols of the general form and/or
polyvinyl alcohols of the general form has proven to be particularly advantageous.

In particular, $R_3$ is a linear or branched alkyl, aryl or aralkyl group having one, more or, in polymer structures, a very large number of carbon atoms, which for their part may comprise further alcohol functions but also other functional groups such as nitrogen-containing groups, phosphorus-containing groups or halogen atoms.

$R_4$ in particular is a group of the general formula $-(CH_2-)_n$ where n=1 to 100.

$R_5$ in particular independently of $R_3$ is a further linear or branched alkyl, aryl or aralkyl group having one, more or, in polymer structures, a very large number of carbon atoms, which for their part may comprise further alcohol functions but also other functional groups such as nitrogen-containing groups, phosphorus-containing groups or halogen atoms.

Secondary amines of the general form have also proven to be advantageous reaction accelerator substances.

In particular, $R_6$ and $R_7$ are each independently linear or branched alkyl, aryl or aralkyl group having one, more or, in polymer structures, a very large number of carbon atoms, which for their part may comprise further amine functions but also other functional groups such as oxygen-containing groups, phosphorus-containing groups or halogen atoms. In addition or as an alternative, $R_6$ and $R_7$ may be joined together in the form of a ring such that the hydrogen-enriched form of the reaction accelerator substance is a cycloamine compound. The cyclic compound may comprise further amine functions, but also other functional groups such as oxygen-containing groups, phosphorus-containing groups or halogen atoms.

$R_8$ can be a further linear or branched alkyl, aryl or aralkyl group having one, more or, in polymer structures, a very large number of carbon atoms, which for their part may comprise further amine functions but also other functional groups such as oxygen-containing groups, phosphorus-containing groups or halogen atoms.

Imine compounds are the corresponding hydrogen-depleted form of this reaction accelerator substance.

A reaction accelerator substance which in the hydrogen-enriched form comprises oligovinylamines and/or polyvinylamines of the general form has proven to be further particularly preferable.

In particular, $R_9$ is a linear or branched alkyl, aryl or aralkyl group having one, more or, in polymer structures, a very large number of carbon atoms, which for their part may comprise further amine functions but also other functional groups such as oxygen-containing groups, phosphorus-containing groups or halogen atoms.

$R_{10}$ in particular is a group of the general formula $-(CH_2-)_n$ where n=1 to 100.

$R_{11}$ can in particular be a further linear or branched alkyl, aryl, or aralkyl group having one, more or, in polymer structures, a very large number of carbon atoms, which for their part may comprise further amine functions but also other functional groups such as oxygen-containing groups, phosphorus-containing groups or halogen atoms.

$R_{12}$ and $R_{13}$ can each independently be a further linear or branched alkyl, aryl, or aralkyl group having one, more or, in polymer structures, a very large number of carbon atoms, which for their part may comprise further amine functions but also other functional groups such as oxygen-containing groups, phosphorus-containing groups or halogen atoms.

A reaction accelerator substance which in the hydrogen-enriched form constitutes a dehydrogenatable heteroalicyclic compound of the general form has also proven suitable.

In particular, $R_{14}$ and/or $R_{16}$ can be a hydrogen atom, a linear or branched alkyl, aryl, or aralkyl group having one, more or, in polymer structures, a very large number of carbon atoms, which for their part may comprise further amine functions but also other functional groups such as oxygen-containing groups, phosphorus-containing groups or halogen atoms.

$R_{15}$ can in particular be one or more linear or branched alkyl, aryl, or aralkyl groups attached at any desired position to the ring and having one, more or, in polymer structures, a very large number of carbon atoms, which for its part may comprise further amine functions but also other functional groups such as oxygen-containing groups, phosphorus-containing groups or halogen atoms or for their part may comprise an oxygen-, nitrogen- or phosphorus-containing functional group or a halogen atom.

A method using a reaction accelerator substance having a vapor pressure ($p_R$) which is greater than the vapor pressure ($p_W$) of the hydrogen carrier medium, wherein in particular $p_R > 1.5\, p_W$, in particular $p_R > 2.0\, p_W$, in particular $p_R > 5.0\, p_W$, in particular $p_R > 10.0\, p_W$, has proven advantageous and in particular enables a simplified separation of the reaction accelerator substance from the released hydrogen gas. It is essential that the vapor pressure of the reaction accelerator is higher and in particular much higher than the vapor pressure of the hydrogen carrier medium, especially under the reaction conditions of the hydrogen release, that is to say the reaction temperature and the reaction pressure. In this method, the reaction accelerator substance is supplied to the reaction vessel and provided there in liquid and/or gaseous form. The reaction accelerator substance is discharged from the reaction vessel in gaseous form together with the hydrogen released. The reaction accelerator substance can be condensed out from the offgas stream and recycled into the reaction vessel. When condensing out the metal-free reaction accelerator substance, hydrogen remains in the gas phase in high purity. The vapor pressure of the reaction accelerator substance is in particular more than twice as great, in particular more than five times as great, in particular more than ten times as great, in particular at least 50 times as great, in particular at least 100 times as great and in particular at least 200 times as great, as the vapor pressure of the hydrogen carrier medium. The LOHC compounds have a vapor pressure at room temperature which is lower than 1 mbar. It is advantageous if the reaction accelerator substance has a vapor pressure at room temperature which is at least 10 mbar. This is the case for example for the reaction accelerator substances acetone, 2-butanone, 2-pentanone, cyclopentanone and/or cyclohexanone.

The vapor pressure of the LOHC substance dibenzyltoluene at room temperature is for example less than 1 mbar. The vapor pressure of the reaction accelerator substance acetone at room temperature is 246 mbar.

As an alternative, in a method wherein the reaction accelerator substance has a vapor pressure ($p_R$) which is lower than the vapor pressure ($p_W$) of the hydrogen carrier medium, wherein in particular $p_R < 0.8\, p_W$, in particular $p_R < 0.6\, p_W$, in particular $p_R < 0.3\, p_W$, in particular $p_R < 0.1\, p_W$, a simplified release of hydrogen can be achieved by the vapor pressure of the reaction accelerator substance being lower and in particular much lower than the vapor pressure of the hydrogen carrier medium, in particular under the conditions of the hydrogen release process. In this method, the metal-free reaction accelerator substance is added to the reaction vessel at the start, the hydrogen released leaves the reaction vessel in gaseous form together with a certain amount of hydrogen carrier medium which is condensed out of the product stream such that hydrogen remains in high purity. In particular, a reaction accelerator substance having a high molecular weight has a low vapor pressure. The reaction accelerator substance is for example a high molecular weight liquid or a high molecular weight compound dissolved in the hydrogen carrier medium, for example a liquid or soluble polymer.

In particular, the vapor pressures under reaction conditions in the reaction vessel are different. This makes it possible for the hydrogen carrier medium to evaporate together with the released hydrogen, while the reaction accelerator substance remains in the reactor.

The hydrogen carrier medium dibenzyltoluene has a vapor pressure of 2.6 mbar at a reaction temperature of 210° C. The reaction accelerator substance, in particular polyvinyl alcohol, has a vapor pressure of below 0.2 mbar at a reaction temperature of 210° C.

In particular, the vapor pressure of the reaction accelerator substance is less than 80% of the vapor pressure of the hydrogen carrier medium, in particular less than 60%, in particular less than 30% and in particular less than 10%.

A method, wherein the reaction accelerator substance has a miscibility gap with the hydrogen carrier medium at a temperature of at most 50° C., enables a simplified separation of the reaction accelerator substance from the hydrogen carrier medium in particular at the outlet from the reaction vessel. In particular, the reaction accelerator substance can be separated from the hydrogen carrier medium by decantation. This is achieved in particular by the reaction accelerator substance, both in the hydrogen-depleted form and as a mixture of hydrogen-enriched form and hydrogen-depleted form, and at reaction temperatures of below 50° C., exhibiting a miscibility gap with the hydrogen carrier medium. This means that the substance mixture in this state space splits into two immiscible liquid phases, that is to say demixes on its own. The separation of the reaction accelerator substance can for example be effected in an uncomplicated manner in a separator.

It has been recognized that an intrinsic property of a mixture of the reaction accelerator substance, which in particular comprises alcohols and/or polyols, and the hydrogen carrier medium, which in particular comprises aromatics and/or cycloalkanes, is that it has a liquid-liquid miscibility gap. The liquid-liquid miscibility gap is present in particular in the mixture of dibenzyltoluene and acetone. The miscibility gap can advantageously be utilized for downstream substance separation steps.

In a method using a reaction accelerator substance configured such that said reaction accelerator substance is present as a solid, the catalyst material in particular having been deposited directly onto the reaction accelerator substance, said reaction accelerator substance can be separated in an uncomplicated manner from the hydrogen gas released and from the hydrogen carrier medium. The reaction accelerator substance is present in particular as a solid. It is advantageous when the reaction accelerator substance is arranged as a solid in the immediate spatial proximity to the metal-containing catalyst. This can be achieved for example by depositing the catalyst directly onto a solid which acts as the reaction accelerator substance. It is advantageous in particular when the reaction accelerator substance exhibits a membrane effect. A membrane effect exists if for example two reaction spaces are separated by the membrane in such a way that preferably small molecules such as hydrogen gas can pass through the membrane with a high diffusion rate. Large molecules such as the hydrogen carrier medium are retained on the membrane and therefore cannot pass through the membrane. Solid reaction accelerator substances are in particular polymers which are distinguished by the fact that they bear in their high molecular weight structure a suitable number of oxygen- or nitrogen-containing functional groups which in contact with an at least partially loaded hydrogen carrier medium are reducible and in this reduced form are readily dehydrogenatable.

Suitable reaction accelerator substances are polymers in which the numerical ratio of groups which are reducible and in the reduced form are readily hydrogenatable to the carbon atoms present in the polymer is less than 100, in particular less than 20 and in particular less than 5.

Such polymer structures can be produced from oxygen- or nitrogen-containing monomers by polymerization. Further solid reaction accelerator substances may be inorganic particles, for example solid metal oxide particles, onto which oxygen-containing or nitrogen-containing organic groups can be attached via covalent immobilization. The covalent immobilization is referred to as so-called "grafting". A solid reaction accelerator substance can also be formed by pyrolysis of oxygen- or nitrogen-containing organic starting substances such as for example sugars or amino sugars or other carbohydrates or amino-functionalized carbohydrates. During the pyrolysis oxygen- or nitrogen-containing functional groups are formed in the pyrolyzate.

An apparatus for dehydrogenating a hydrogen carrier medium, having at least one reaction vessel and a contacting unit arranged in the at least one reaction vessel, makes it possible to carry out the method according to the invention. The apparatus ensures that intensive contact between the loaded hydrogen carrier medium, the metal-containing catalyst and the metal-free reaction accelerator substance is guaranteed. The intensive contact of the substances mentioned is essential to the efficiency, in particular the release rate of the hydrogen, in the method according to the invention. The intensive contacting of the substances is effected by means of a contacting unit arranged in the reaction vessel. The intensive contact can for example be effected via a stirrer, static mixing elements or an appropriate guidance of the flow of the substances in the reaction vessel. Flow guiding elements can be provided in the reaction vessel for the appropriate guidance of flow. The reaction vessel may for example be a stirred tank reactor, a loop reactor with static mixers, a trickle-bed reactor, a fixed bed reactor with intensive throughflow and/or a bubble column reactor. The reaction vessel can be linked with further process apparatuses, vessels and units to form a hydrogen releasing apparatus. The hydrogen releasing apparatus in particular has a control unit for process control which is bidirectionally signal-connected to heating units, pumps and/or valves of the hydrogen releasing apparatus. According to the invention, the hydrogen releasing apparatus is operated at total pressures of below 50 bar, in particular of below 20 bar and in particular of below 3 bar.

Both the features specified in the patent claims and the features specified in the following exemplary embodiments of the apparatus according to the invention and of the method according to the invention are suitable in each case alone or in combination for developing the subject matter according to the invention. The respective combinations of features with respect to the developments of the subject matter of the invention do not constitute any restriction but instead essentially are merely of an exemplary nature.

Further features, advantages and details of the invention become apparent from the following description of exemplary embodiments with reference to the drawing.

DESCRIPTION OF THE PREFERRED EMBODIMENTS

Individual characteristics of the exemplary embodiments elucidated in more detail hereinafter may also, taken alone, constitute an invention or form part of the subject matter of the invention.

Figure 1:
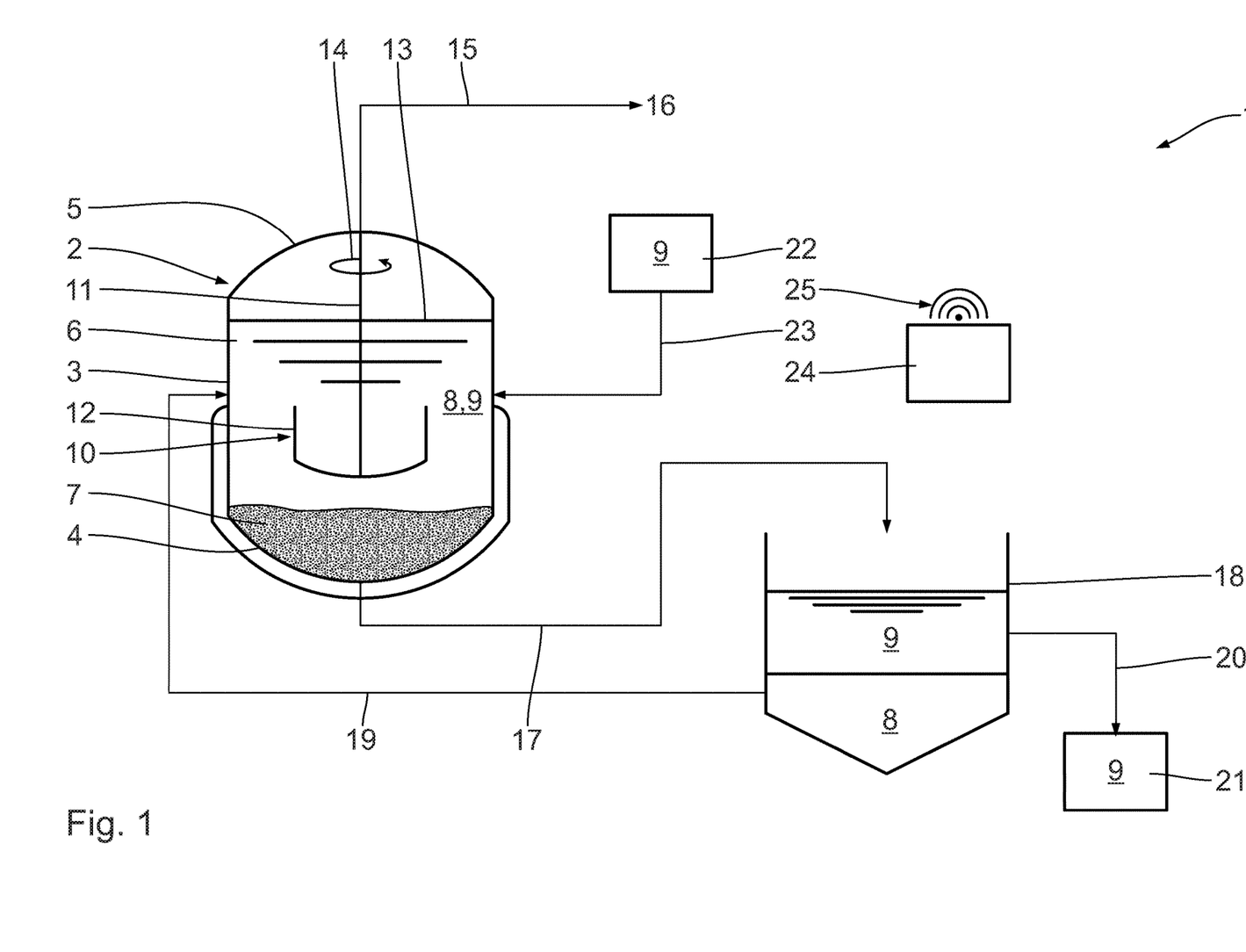
FIG. 1 shows a schematic illustration of an apparatus according to a first exemplary embodiment having a reaction vessel in the form of a stirred tank reactor for dehydrogenating a hydrogen carrier medium.

A hydrogen releasing apparatus, identified as a whole with 1 in FIG. 1, has a reaction vessel 2 which according to the exemplary embodiment shown is designed as a stirred tank reactor. The reaction vessel 2 has a closed housing 3 having a base 4, a lid 5 and a side wall 6 connecting the base 4 with the lid 5.

A metal-containing catalyst material 7 is arranged in particular as a particle bed in the reaction vessel 2, in particular in the region of the base 4. A liquid, metal-free reaction accelerator substance 8 and an at least partially loaded hydrogen carrier medium 9, in particular heteroatom-free LOHC, are additionally provided in the reaction vessel 2.

The reaction vessel 2 has a contacting unit 10 which is designed as a stirrer in the exemplary embodiment shown. The stirrer is rotatable about an axis of rotation 11 which is oriented in particular parallel to the longitudinal axis of the housing 3 and is oriented in particular parallel to the, in particular cylindrical, side wall 6 of the housing 3. The stirrer is arranged with its stirring elements 12 below the level 13 of the mixture of reaction accelerator substance 8 and hydrogen carrier medium 9. The direction of rotation of the stirrer about the axis of rotation 11 is represented by the arrow 14.

The reaction vessel 2 has, in particular on the lid 5, a hydrogen discharge line 15 via which the gaseous hydrogen 16 released in the reaction vessel 2 can be sent to a further use, for example to a conversion to electricity in a fuel cell or to thermal utilization. The hydrogen discharge line 15 may also be connected at a different position on the housing 3. It is advantageous if the hydrogen discharge line 15 is arranged at a point on the housing 3 which lies above the level 13.

A liquid discharge line 17 leading to a separator 18 is also connected to the reaction vessel 2. The separator 18 is connected to the reaction vessel 2 via a return line 19. The connection for the liquid discharge line 17 on the reaction vessel 2 is provided according to the exemplary embodiment shown at the base 4, in particular at the lowest point of the housing 3. This ensures a particularly advantageous removal of liquid from the reaction vessel 2. The hydrogen discharge line 17 may also be connected to the reaction vessel 2 at a different position of the housing 3. It is advantageous if the connection point for the liquid discharge line 17 is arranged at a point of the housing 3 which is arranged below the level 13.

The connection point for the return line 19 on the reaction vessel 2 is provided in particular in the region of the stirring elements 12. This improves the mixing of the returned reaction accelerator substance 8 with the liquid mixture already present in the reaction vessel 2.

The separator 18 is also connected via a fluid line 20 to a first storage vessel 21 for unloaded hydrogen carrier medium 9.

A second storage vessel 22 for loaded hydrogen carrier medium 9 is connected via a hydrogen carrier medium supply line 23 to the reaction vessel 2. The hydrogen carrier medium supply line 23 is arranged on the housing 3 in particular in a region of the stirring elements 12. The mixing of the supplied, loaded hydrogen carrier medium 9 with the liquid mixture present in the reaction vessel 2 is improved as a result.

The hydrogen releasing apparatus 1 has a control unit 24 which is signal-connected to the individual components of the hydrogen releasing apparatus 1, in particular the reaction vessel 2, the separator 18, the first storage vessel 21, the second storage vessel 22. The control unit 24 is in particular signal-connected to further units not illustrated in more detail in FIG. 1, such as heating units, pumps and/or valves, which are arranged in particular along the lines 15, 17, 19, 20 and 23. It is possible by means of the control unit 24 to actively control the method for releasing hydrogen gas in order for example to monitor and influence the reaction conditions in the reaction vessel 2, in particular reaction temperature and/or reaction pressure and also the liquid level 13.

For the monitoring, appropriate sensors are arranged in or on the components mentioned and are likewise signal-connected to the control unit 24. The signal connections can, as indicated in FIG. 1 with the symbol 25, be implemented wirelessly, in particular as a radio connection. The signal connections can in addition or alternatively be implemented in wired fashion.

The operation of the hydrogen releasing apparatus 1 is elucidated in more detail hereinafter and by way of example for the use of a polyvinyl alcohol having a molar mass of over 10000 g/mol as reaction accelerator substance 8 and perhydrodibenzyltoluene as hydrogen-loaded hydrogen carrier medium 9.

Palladium on activated carbon as metal-containing catalyst material 7, polyvinyl alcohol as metal-free reaction accelerator substance 8 and perhydrodibenzyltoluene as hydrogen carrier medium 9 are provided in the reaction vessel 2. The reaction accelerator substance 8 is present as a liquid and in the exemplary embodiment shown exhibits thermomorphic behavior. That means that the reaction accelerator substance 8 is at least partially dissolved in the hydrogen carrier medium 9 under the reaction conditions of 200° C. and a total pressure of less than 2 mbar in the reaction vessel 2.

As a result of the intensive contact arising due to the stirring of the liquid mixture 8, 9 and the catalyst material 7, hydrogen gas is first released from the polyvinyl ketone to form a corresponding polyketone or corresponding enol. Next, the hydrogen is transferred from the hydrogen carrier medium 9 to the at least partially hydrogen-unloaded reaction accelerator substance 8. The hydrogen-rich form of the reaction accelerator substance 8 thus formed, that is to say the corresponding polyvinyl alcohol, is dehydrogenated under the same reaction conditions in the reaction vessel 2, with the release of hydrogen. The liquid mixture 8, 9 is discharged from the reaction vessel 2 and supplied to the separator 18 via the liquid discharge line 17.

A temperature of at the most 50° C. prevails in the separator 18. It is particularly advantageous that the reaction accelerator substance 8 has a miscibility gap with the hydrogen carrier medium 9 at a temperature of at the most 50° C. As shown schematically in FIG. 1, two discrete, separate liquid layers independently form in the separator 18, with the reaction accelerator substance 8 being present at the bottom and the comparatively less dense hydrogen carrier medium 9 being present at the top in the separator 18. The density of the polyvinyl alcohols is in particular more than 1.1 g/cm$^3$. The density of dibenzyltoluene is approximately 1.05 g/cm$^3$. The reaction accelerator substance 8 can be separated from the hydrogen carrier medium 9 in an uncomplicated manner and can be supplied to the reaction vessel 2 for reuse via the return line 19.

The unloaded hydrogen carrier medium 9 is conveyed out from the separator 18 and into the first storage vessel 21 via the fluid line 20. The unloaded hydrogen carrier medium 9 can be enriched with hydrogen again, that is to say loaded, by means of a loading station. The loading station can be arranged at the location of the hydrogen releasing apparatus 1 or remote therefrom. Loaded or reloaded hydrogen carrier medium 9 is stored in the second storage vessel 22 and supplied to the reaction vessel 2 via the hydrogen carrier supply line 23.

Hydrogen 16, which passes from the hydrogen carrier medium 9 to the reaction accelerator substance 8 in particular directly or in atomic form, can be emitted by the reaction accelerator substance 8 as hydrogen gas 16 and discharged from the reaction vessel 2 via the hydrogen discharge line 15.

Figure 2:
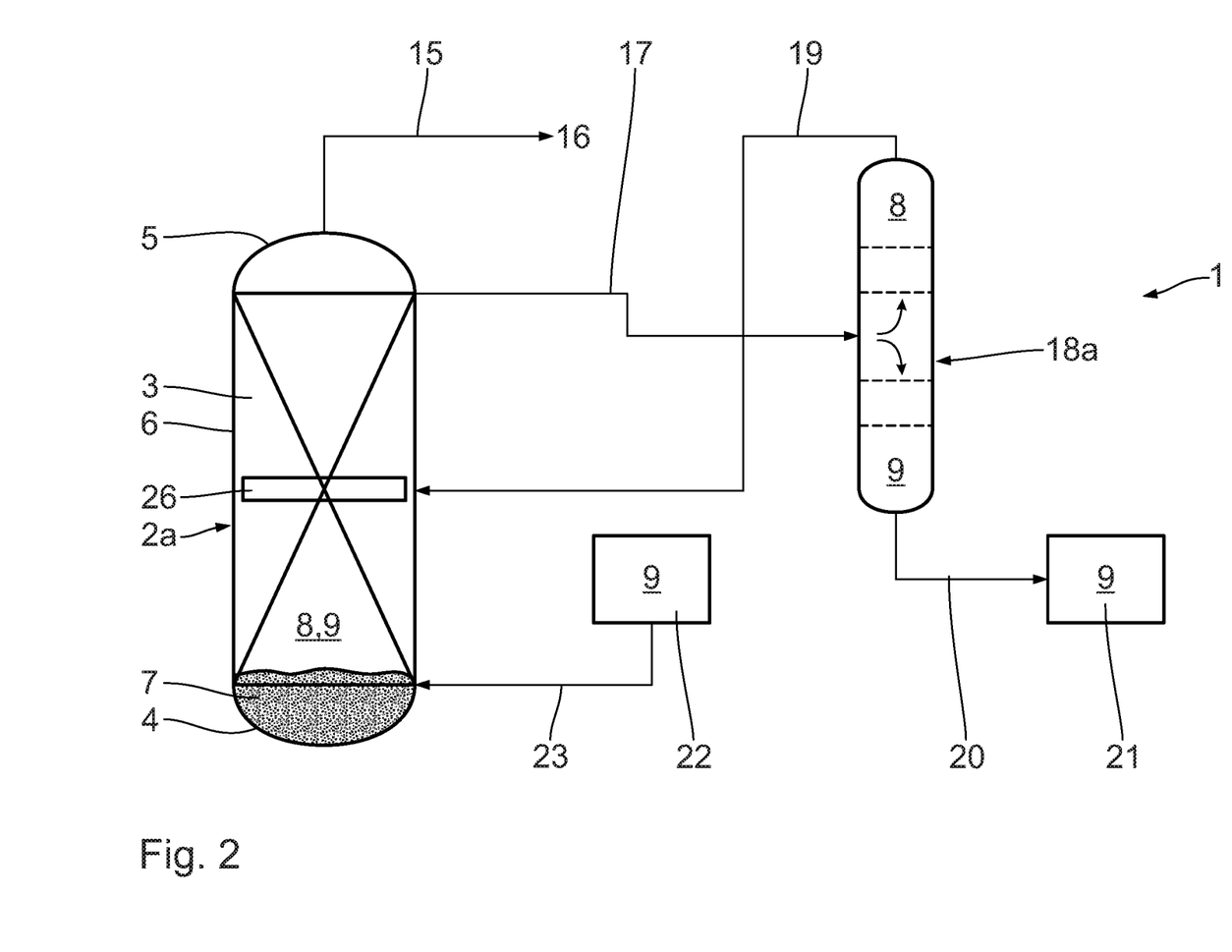
FIG. 2 shows an illustration, corresponding to FIG. 1, of an apparatus according to a second exemplary embodiment having a bubble column reactor as the reaction vessel.

A second exemplary embodiment of the invention is described hereinbelow with reference to FIG. 2. Parts which are identical in construction are given the same reference numbers as in the first exemplary embodiment, to the description of which reference is hereby made. Parts which differ in construction but are functionally similar are given the same reference numerals with an appended "a".

The essential difference from the first exemplary embodiment is that the reaction vessel 2a is designed as a bubble column reactor. The catalyst material 7, the liquid hydrogen carrier medium 9 and the reaction accelerator substance 8, which may be present in liquid and/or gaseous form, are arranged in the reaction vessel 2a. It is essential in this embodiment that the reaction accelerator substance under the conditions in the reaction vessel 2a has a vapor pressure $p_R$ which is markedly above the vapor pressure $p_W$ of the hydrogen carrier medium 9. The reaction accelerator substance 8 is in particular acetone. The hydrogen carrier medium 9 is perhydrodibenzyltoluene. Perhydrodibenzyltoluene is present in liquid form under the reaction conditions mentioned by way of example, with a reaction temperature of 210° C. and a total pressure of below 2 bar. The vapor pressure $p_R$ is around 2 mbar. In contrast, acetone is present in gaseous form under these reaction conditions, in particular the reaction temperature and the total pressure.

The bubble column reactor is a process apparatus for gas/liquid processes. The bubble column reactor features a liquid, in the present case hydrogen carrier medium 9, into which gas, in the present case the reaction accelerator substance 8, is introduced and bubbles through the liquid, generating a phase interface between the reaction accelerator substance 8 and the liquid hydrogen carrier medium 9 in the process. The gas is introduced in particular via a perforated distributor plate, an evaporator element or a sparger as distributor element 26, which is connected to the return line 19. According to the exemplary embodiment shown, the distributor element 26 is arranged approximately centrally on the side wall 6 between the base 4 and lid 5.

The hydrogen carrier medium supply line 23 is provided on the housing 3 beneath the connection point for the return line 19. According to the exemplary embodiment shown, hydrogen carrier medium 9 and the reaction accelerator substance 8 are supplied in a cocurrent mode and the bubble column reactor is operated in a cocurrent mode. It is also conceivable to conduct the method in a countercurrent mode.

Via the liquid discharge line 17, which is arranged in particular in the upper region of the housing 3 adjacent to the lid 5, a mixture of reaction accelerator substance 8 and hydrogen carrier medium 9 is discharged from the reaction vessel 2a and supplied to the separator 18a. Due to the much higher vapor pressure of the reaction accelerator substance 8 compared to the hydrogen carrier medium 9, the two substances are separated in an uncomplicated manner in the separator 18a, which is designed as an air-cooled or water-cooled condenser. The condenser 18a can contain internals in order to increase the surface area in the condenser 18a and in this way to improve the condensing effect.

A third exemplary embodiment of the invention is described hereinbelow with reference to FIG. 3. Parts which are identical in construction are given the same reference numbers as in the first exemplary embodiment, to the description of which reference is hereby made. Parts which differ in construction but are functionally similar are given the same reference numerals with an appended "b".

The essential difference from the previous exemplary embodiments is that the reaction vessel 2b is designed as a fixed bed reactor. A solid is filled into the fixed bed reactor. The solid is the metal-free reaction accelerator substance 8, the solid simultaneously serving as a porous carrier material for the metal-containing catalyst 7. This solid can, at spatially separate locations of its structure, provide both the function of the metal-free reaction accelerator 8 and the function of the metal-containing catalyst 7. According to the exemplary embodiment shown, the solid, metal-free reaction accelerator substance 8 is a porous sugar pyrolysis product which contains alcohol functionalities and serves as a support material for the metal-containing catalyst 7, by way of example here platinum nanoparticles.

Figure 3:
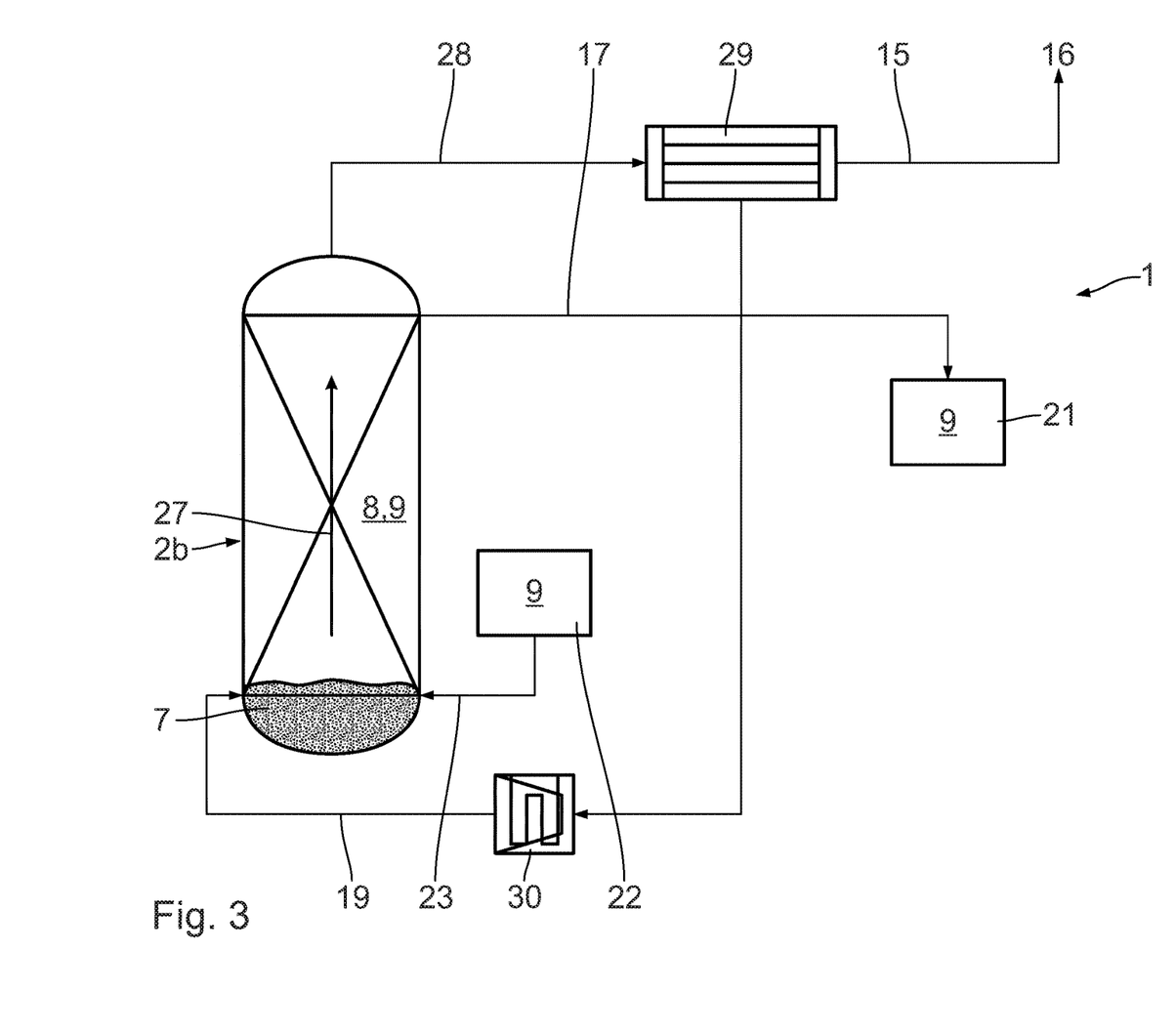
FIG. 3 shows an illustration, corresponding to FIG. 1, of an apparatus according to a third exemplary embodiment having a fixed bed reactor as the reaction vessel.

The loaded hydrogen carrier medium 9 flows through the reaction vessel 2b for example at a temperature of 240° C. and a total pressure of 1 bar according to the exemplary embodiment shown in FIG. 3 from bottom to top along the flow direction 27. This first hydrogenates the reaction accelerator substance 8, with hydrogen subsequently being emitted from the reaction accelerator substance 8 again in elemental form as gas in a dehydrogenation reaction and being discharged together with evaporated hydrogen carrier medium 9 from the reaction vessel 2b via a mixing line 28.

A condenser 29 in which the gaseous output hydrogen carrier medium 9 is condensed is connected to the mixing line 28. The condensed hydrogen carrier medium 9 is recycled into the reaction vessel 2b via a heat exchanger 30 and the return line 19. Pure gaseous hydrogen 16 is discharged from the condenser 29 via the hydrogen discharge line 15. The at least partially unloaded hydrogen carrier medium 9 leaves the reaction vessel 2b via the liquid discharge line 17 predominantly in liquid form and is supplied in particular to the first storage vessel 21.

The return line 19 and the hydrogen carrier medium supply line 23 are each arranged in a lower region of the reaction vessel 2b. The reaction accelerator substance 8 and the loaded hydrogen carrier medium 9 flow through the fixed bed reactor together along the flow direction 27, that is to say in a cocurrent mode. The fixed bed reactor can also be operated in a countercurrent mode.

A fourth exemplary embodiment of the invention is described hereinbelow with reference to FIG. 4. Parts which are identical in construction are given the same reference numbers as in the first exemplary embodiment, to the description of which reference is hereby made. Parts which differ in construction but are functionally similar are given the same reference numerals with an appended "c".

The essential difference from the previous exemplary embodiment is that the vessel 2c has a reaction-accelerating membrane 31 which separates the reaction vessel into a first partial space 32 and a second partial space 33. The reaction-accelerating membrane 31 is produced from the solid of the reaction accelerator substance 8. The reaction acceleration substance 8 forms a structural framework of the membrane 31 and additionally serves as a support for the metal-containing catalyst 7 applied thereto. It is advantageous if the membrane material acts to accelerate the reaction and possesses proton conductivity and/or selective hydrogen permeability, in particular from the first partial space 32 into the second partial space 33. In this way, pure hydrogen gas can be obtained on the permeate side, that is to say in the second partial space 33. The hydrogen released is removed from the equilibrium via transport through the membrane 31, so that equilibrium limitations in the dehydrogenation reaction can be overcome.

Figure 4:
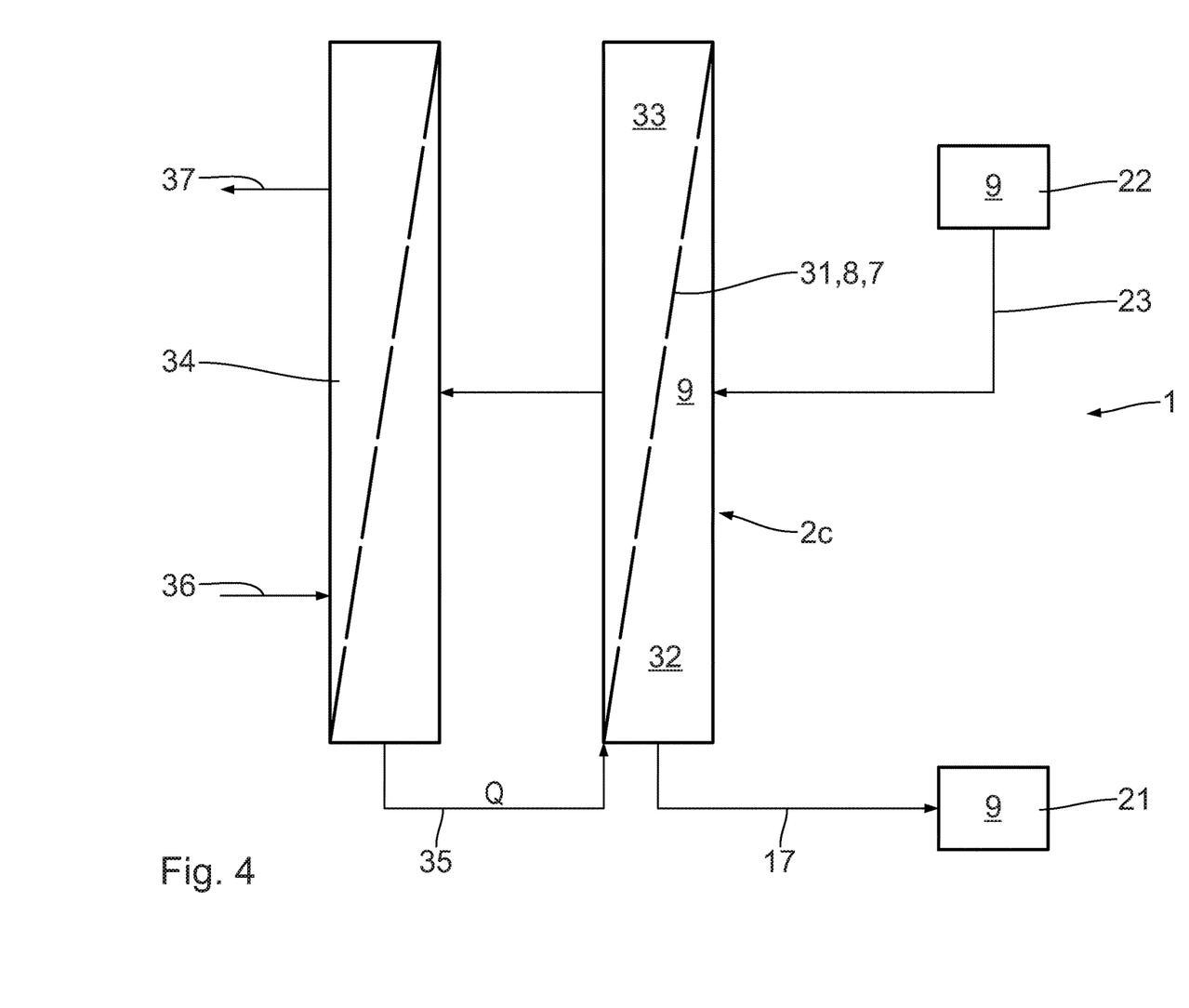
FIG. 4 shows an illustration, corresponding to FIG. 1, of an apparatus according to a fourth exemplary embodiment having a reaction-accelerating membrane in a reaction vessel.

According to the exemplary embodiment shown in FIG. 4, a fuel cell 34 is arranged adjacent to the reaction vessel 2c. Heat formed during the exothermic operation of the fuel cell can be utilized for the operation of the reaction-accelerating membrane 31 directly and in particular without using a heat exchanger. A direct heat transfer line 35 which connects the fuel cell 34 to the reaction vessel 2c, in particular to the membrane 31 arranged therein, serves this purpose. A heat exchanger which is mounted on the fuel cell 34 and heats a heat transfer medium, in particular the hydrogen carrier medium 9 usable as heat transfer medium, is used for the heat transfer. The heated heat transfer medium is supplied to the reaction vessel 2c in order to heat same with the aid of a heat exchanger.

As an alternative, the heat transfer can be implemented particularly advantageously by situating the fuel cell 34 and the reaction vessel 2c in a thermally insulated container. The heat generated by the fuel cell 34 can thus be made available for use directly for the hydrogen release in the reaction vessel 2c.

In addition or as an alternative, a heat pipe, which isothermally and particularly efficiently connects the spatially adjacently arranged fuel cell to the reaction vessel, can be used for the heat transfer.

The fuel cell 34 further has a supply line 36 for supplying oxygen, in particular ambient air, to the fuel cell 34. A power line 37 is connected to the fuel cell 34 in order to couple out electrical energy from the fuel cell 34.

It is further advantageous that a steeper gradient for the hydrogen concentration across the hydrogen releasing apparatus 1 is produced by the hydrogen consumption in the fuel cell 34. Overall, therefore, the thermodynamic driving force for the hydrogen release rises, so that the release rate is additionally increased.

Figure 5:
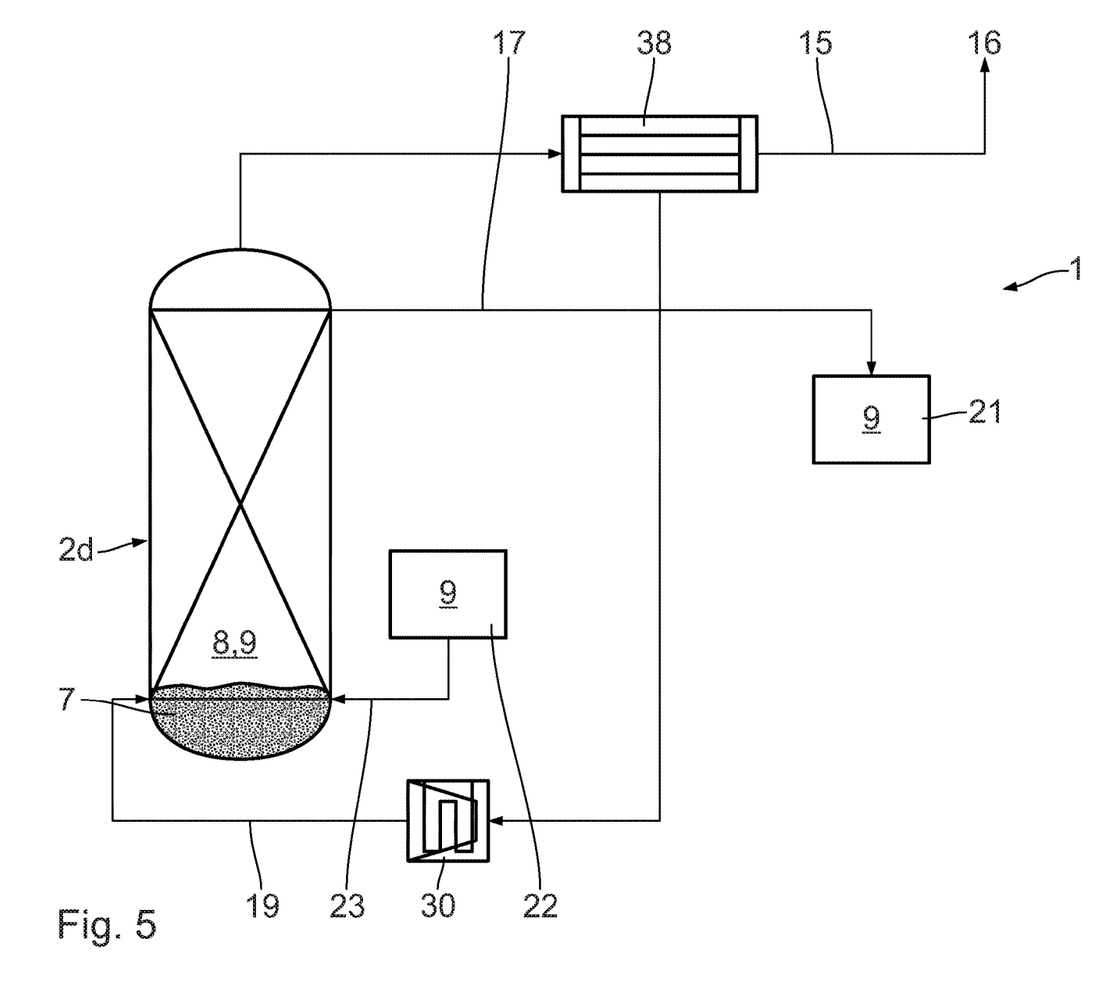
FIG. 5 shows having two separate reaction vessels arranged in series.

A fifth exemplary embodiment of the invention is described hereinbelow with reference to FIG. 5. Parts which are identical in construction are given the same reference numbers as in the first exemplary embodiment, to the description of which reference is hereby made. Parts which differ in construction but are functionally similar are given the same reference numerals with an appended "d".

The essential difference from the third exemplary embodiment is that, in addition to the reaction vessel 2d, which is designed as a fixed bed reactor, a second reaction vessel 38 is provided.

The hydrogen transfer from the loaded hydrogen carrier medium 9 to the reaction accelerator substance 8 takes place in the first reaction vessel 2d in the manner described. The enriched form of the reaction accelerator substance 8 is supplied to the second reaction vessel 38 in which the hydrogen is released. It is essential that the metal-containing catalyst 7 is present both in the first reaction vessel 2d and in the second reaction vessel 38.

The catalysts in the reaction vessels 2d, 38 can be identical or different.

According to this embodiment, the component reactions are divided between different reaction vessels 2d, 38. This means that the reaction conditions can be better adapted to the respective component reaction.

The fifth exemplary embodiment affords the advantages in particular that the reaction temperature and the reaction pressure for the hydrogen transfer from the hydrogen carrier medium 9 to the reaction accelerator substance 8, on the one hand, and for the release of hydrogen gas from the reaction accelerator substance 8 which has been enriched in hydrogen in this way, on the other hand, can be selected independently of each other. Thus, for example, the transfer of hydrogen from the hydrogen carrier medium 9 to the reaction accelerator substance can be conducted at a reaction pressure of 1 bar and a temperature of just 180° C. With the aim of an increased hydrogen gas pressure, the release of hydrogen gas from the reaction accelerator substance 8 can be conducted for example at 240° C. and 5 bar total pressure.

Condensing the hydrogen-depleted reaction accelerator substance 8 in the second reaction vessel 38 produces pure hydrogen gas 16. The condensed reaction accelerator substance is recycled as a liquid into the first reaction vessel 2d via the return line 19.

In an example of a method according to the invention, 290 g of perhydrodibenzyltoluene as loaded hydrogen carrier medium with a degree of hydrogenation of 99% and 5.3 g of a commercial Pd-on-carbon catalyst containing 5% by weight of Pd, and also 58 g of acetone as reaction accelerator substance, are mixed in an autoclave.

0.265 g of Pd are present in the autoclave, corresponding to an amount of 0.25 mol % based on the perhydrodibenzyltoluene used. In addition, perhydrodibenzyltoluene and acetone are present in the autoclave in equimolar amounts. The autoclave is heated to 210° C. and kept at this temperature for five hours with stirring. The autoclave is then cooled back down to room temperature and the autoclave pressure is determined at room temperature. Thereafter, the autoclave is depressurized, opened and a sample of liquid is taken. It is apparent that a considerable amount of hydrogen gas has been formed. The pressure in the autoclave after complete cooling down to room temperature was over 16 bar. Analysis of the gas phase by gas chromatography revealed that the gas phase consisted exclusively of hydrogen. The liquid sample revealed a decrease in the degree of hydrogenation of the hydrogen carrier medium of more than 10%, i.e. a decrease to less than 90%.

Upon comparable conduction of the hydrogen release in accordance with the prior art, that is to say without the use of acetone but under otherwise identical reaction conditions, it was possible to detect only a vanishingly small amount of hydrogen. The pressure in the autoclave after cooling down to room temperature was less than 1.5 bar. A decrease in the degree of hydrogenation of less than 1%, i.e. a decrease to approximately 98%, was detected.

The invention claimed is:

1. A method for dehydrogenating a hydrogen carrier medium, the method comprising the method steps of:
   providing:
      a metal-containing catalyst material;
      an at least partially loaded hydrogen carrier medium, and
      a metal-free reaction accelerator substance;
   transferring hydrogen from the hydrogen carrier medium to the reaction accelerator substance; and
   releasing hydrogen gas from the reaction accelerator substance.

2. The method as claimed in claim 1, further comprising providing a reaction pressure of from 0.001 bar to 50 bar.

3. The method as claimed in claim 1, further comprising providing a reaction temperature of from 25° C. to 400° C.

4. The method as claimed in claim 1, wherein the releasing of hydrogen gas is with a release rate of at least 10 standard liters of hydrogen per liter of catalyst volume and per minute at a reaction temperature of less than 250° C.

5. The method as claimed in claim 1, wherein reaction accelerator substance has at least one functional group which contains at least one of oxygen and nitrogen.

6. The method as claimed in claim 1, wherein the reaction accelerator substance in the hydrogen-enriched form comprises secondary alcohols of the form

7. The method as claimed in claim 1, wherein the reaction accelerator substance in the hydrogen-enriched form comprises at least one of oligovinyl alcohols of the form and polyvinyl alcohols of the form

8. The method as claimed in claim 1, wherein the reaction accelerator substance in the hydrogen-enriched form comprises secondary amines of the form 9. The method as claimed in claim 1, wherein the reaction accelerator substance in the hydrogen-enriched form comprises at least one of oligovinylamines and polyvinylamines of the form 10. The method as claimed in claim 1, wherein reaction accelerator substance in the hydrogen-enriched form comprises a dehydrogenatable heteroalicyclic compound of the form of one of 11. The method as claimed in claim 1, wherein reaction accelerator substance has a vapor pressure ($p_R$) which is greater than the vapor pressure ($p_W$) of the hydrogen carrier medium, wherein $p_R > 1.5\, p_W$.

12. The method as claimed in claim 1, wherein the reaction accelerator substance has a vapor pressure ($p_R$) which is lower than the vapor pressure ($p_W$) of the hydrogen carrier medium, wherein $p_R < 0.8\, p_W$.

13. The method as claimed in claim 1, wherein the reaction accelerator substance has a miscibility gap with the hydrogen carrier medium at a temperature of at most 50° C.

14. The method as claimed in claim 1, wherein the reaction accelerator substance is present as a solid.

15. An apparatus for dehydrogenating a hydrogen carrier medium, by providing: a metal-containing catalyst material; an at least partially loaded hydrogen carrier medium, and a metal-free reaction accelerator substance; transferring hydrogen from the hydrogen carrier medium to the reaction accelerator substance; and releasing hydrogen gas from the reaction accelerator substance, the apparatus comprising:
 at least one reaction vessel; and
 a contacting unit arranged in the at least one reaction vessel.

16. The method as claimed in claim 1, further comprising providing a reaction pressure of less than 0.1 bar.

17. The method as claimed claim 1, further comprising providing a reaction temperature of less than 100° C.

18. The method as claimed in claim 1, wherein the catalyst material has been deposited directly onto the reaction accelerator substance.

\* \* \* \* \*